United States Patent

Choi et al.

[11] Patent Number: 6,059,416
[45] Date of Patent: May 9, 2000

[54] ACTUATED MIRROR ARRAY AND METHOD FOR THE FABRICATING THEREOF

[75] Inventors: Young-Jun Choi; Eui-Jun Kim, both of Seoul, Rep. of Korea

[73] Assignee: Daewoo Electronics Co., Ltd., Rep. of Korea

[21] Appl. No.: 08/299,182

[22] Filed: Aug. 31, 1994

[30] Foreign Application Priority Data

Aug. 31, 1993 [KR] Rep. of Korea ........................ 93-17223
Oct. 29, 1993 [KR] Rep. of Korea ........................ 93-22793

[51] Int. Cl.⁷ ........................................................ G02B 5/08
[52] U.S. Cl. .......................... 359/850; 359/872; 359/220; 359/223; 359/224; 359/226
[58] Field of Search ..................... 359/850, 883, 359/884, 361, 359, 220, 221, 222, 223, 224, 225, 226, 871, 872, 291, 292, 846, 849, 875

[56] References Cited

U.S. PATENT DOCUMENTS

| 3,886,310 | 5/1975 | Guldberg et al. ........................ 315/374 |
| 4,592,628 | 6/1986 | Altman et al. ........................... 359/224 |
| 5,212,582 | 5/1993 | Nelson ..................................... 359/224 |

*Primary Examiner*—Cassandra Spyrou
*Assistant Examiner*—Mohammad Y. Sikder
*Attorney, Agent, or Firm*—Anderson Kill & Olick

[57] ABSTRACT

Fabrication and mounting of an array of M×N mirrors on an array of M×N electrodisplacive actuators is carried out by one of the two inventive methods, comprising the steps of: patterning a substrate into an array of M×N protrusions; forming subsequently a separation layer, a first, a second and a third metallic layers on a top of the array of M×N protrusions; bonding the array of M×N actuators on the protrusions; disengaging the array of M×N protrusions from an array of M×N mirror bodies by removing the separation layer; and forming a fourth metallic layer on the first metallic layer so as to provide the reflector to thereby provide the array of M×N actuated mirrors. The other method comprises the steps of: clamping physically a thin glass on a top surface of a substrate; plating a top surface of the thin glass with a bonding layer; bonding the array of M×N actuators on a top surface of the bonding layer and removing a portions of the bonding layer which is not connected with a top surface of the array of M×N actuators; forming a metallic layer on the thin glass; patterning the metallic layer into the array of M×N mirrors; cutting a portion of the thin glass which is not contacted with the array of M×N mirror to thereby provide the array of M×N actuated mirror.

4 Claims, 7 Drawing Sheets

ACTUATED MIRROR ARRAY AND METHOD FOR THE FABRICATING THEREOF

FIELD OF THE INVENTION

The present invention relates to an array of electrodisplacive actuated mirrors for use in an optical projection system; and, more particularly, to an improved method for fabricating and mounting an array of mirrors on an array of electrodisplacive actuators to thereby form an array of electrodisplacive actuated mirrors for use in the system.

BACKGROUND OF THE INVENTION

Video display systems generally display an image in an array of pixels. Among various video display systems, an optical projection system is known in the art to be capable of providing a high quality video display in a large scale. In one particular optical projection system, light from a lamp is uniformly illuminated onto an array of, e.g., M×N actuated mirrors, wherein each of the M×N mirrors is coupled with each of the M×N actuators. The actuators are made of an electrodisplacive material such as a piezoelectric or an electrostrictive material which deforms in response to an electrical signal applied thereto.

The reflected light beam from each of the mirrors is incident upon an aperture. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as projection lens, thereby offering a displayed image thereon.

The present invention concerns primarily with a method for fabricating and mounting an array of M×N mirrors on an array of M×N electrodisplacive actuators to thereby form an array of M×N electrodisplacive actuated mirrors for use in the optical projection system described above.

Figure 1A:
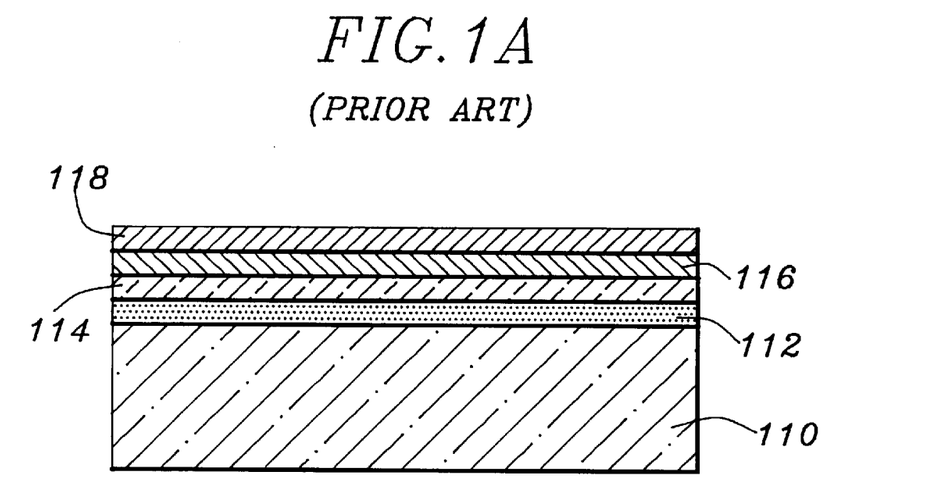
FIGS. 1A to 1F depict schematic cross sectional views illustrating the sequence of a conventional fabricating and mounting process used in forming an array of mirrors on an array of actuators.

In FIGS. 1A to 1F, there is illustrated a conventional fabrication processing sequence for fabricating an array of mirrors on an array of actuators. It involves, first, as shown in FIG. 1A, the formation of a separation layer 112 on a flat top surface of a substrate 110. The formation of the separation layer 112 is carried out by the spin-coating of a photoresist. Then, a first metallic layer 114 is deposited on top of the separation layer 112 by using, e.g., sputtering. The first metallic layer 114 serves as a reflector for reflecting incident light beams and is made of a light reflecting metal such as aluminum (Al). Subsequently, a second and a third metallic layers 116, 118 are applied on the first metallic layer 114 by using a similar technique used in the formation of the first metallic layer 114. The second metallic layer 116 functions as an intermediate layer for conferring good adhesion between the first metallic layer 114 and the third metallic layer 118. Copper (Cu) and nickel(Ni) are commonly used for the second layer 116 and the third metallic layer 118, respectively.

Figure 1B:
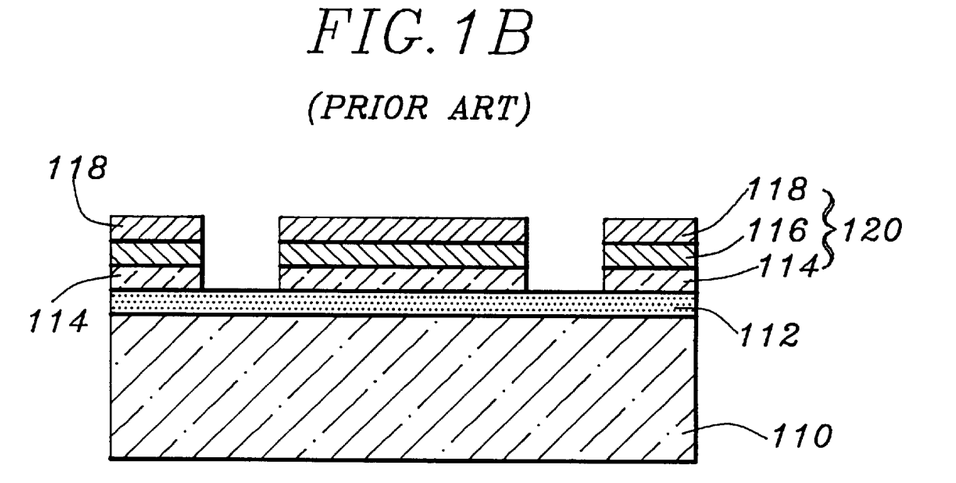
Figure 1C:
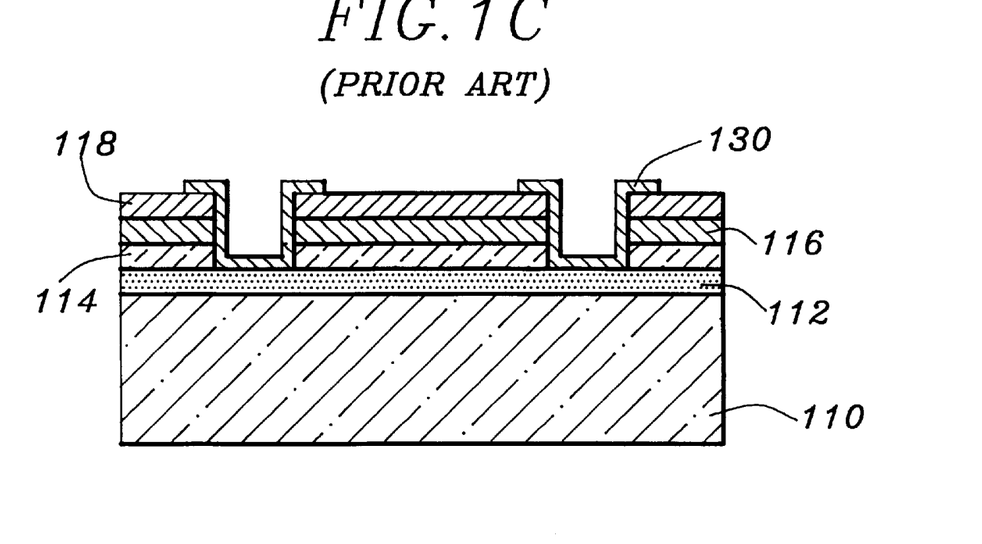

In the subsequent step, the metallic layers 114, 116, 118 are patterned into an M×N mirror array structure 120 by employing a conventional photolithography process, as shown in FIG. 1B. In the following step as shown in FIG. 1C, a photoresist layer 130, composed of the same photoresist as used in the separation layer 112, is applied onto the structure treated in the steps shown in FIGS. 1A to 1B, and subsequently defined for exposing the top surface of the third metallic layer 118. The exposed surface acts as a seed in the following electroplating process.

Figure 1D:
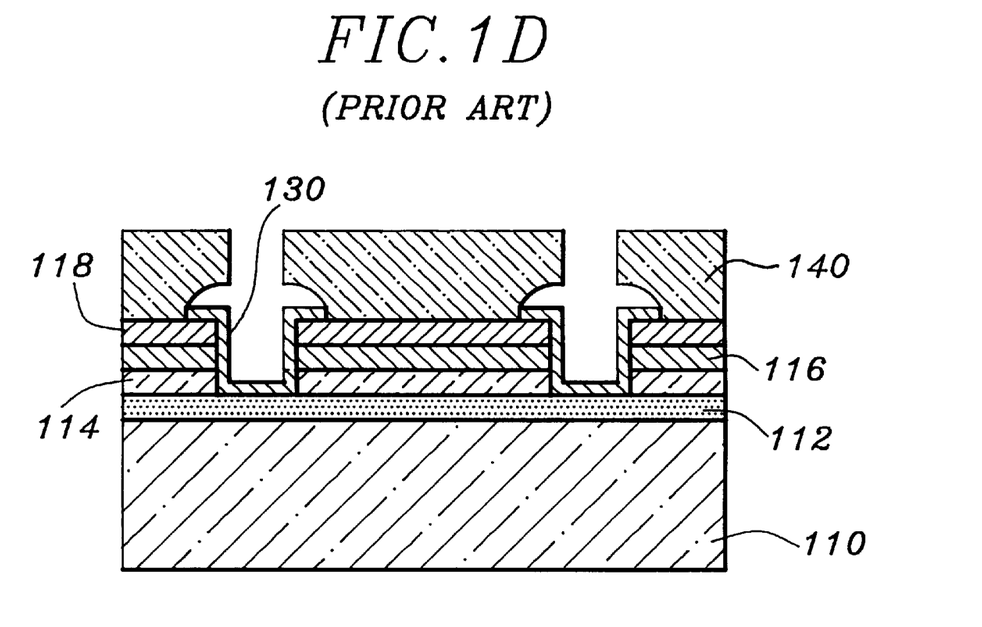
Figure 1E:
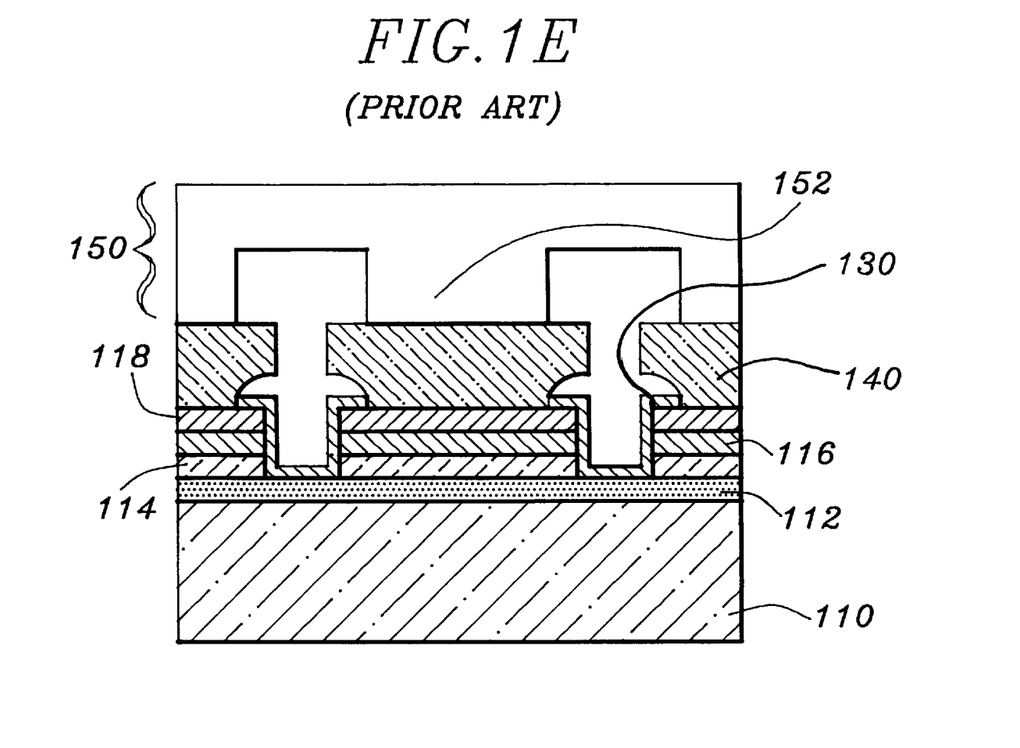

Thereafter, a fourth metallic layer 140, composed of the same metallic material as the one used in the forming of the third metallic layer 118, is electroplated, as shown in FIG. 1D, on the surface of the third metallic layer 118 which is not covered by the photoresist layer 130. An M×N actuator array 150 is then bonded onto a top surface of the fourth metallic layer 140 such that each of the actuators, e.g., 152, in the M×N actuator array 150 is aligned with each of the M×N mirrors in the M×N mirror array structure as shown in FIG. 1E, wherein each of the M×N mirrors is comprised of the metallic layers 114, 116, 118 and 140.

Figure 1F:
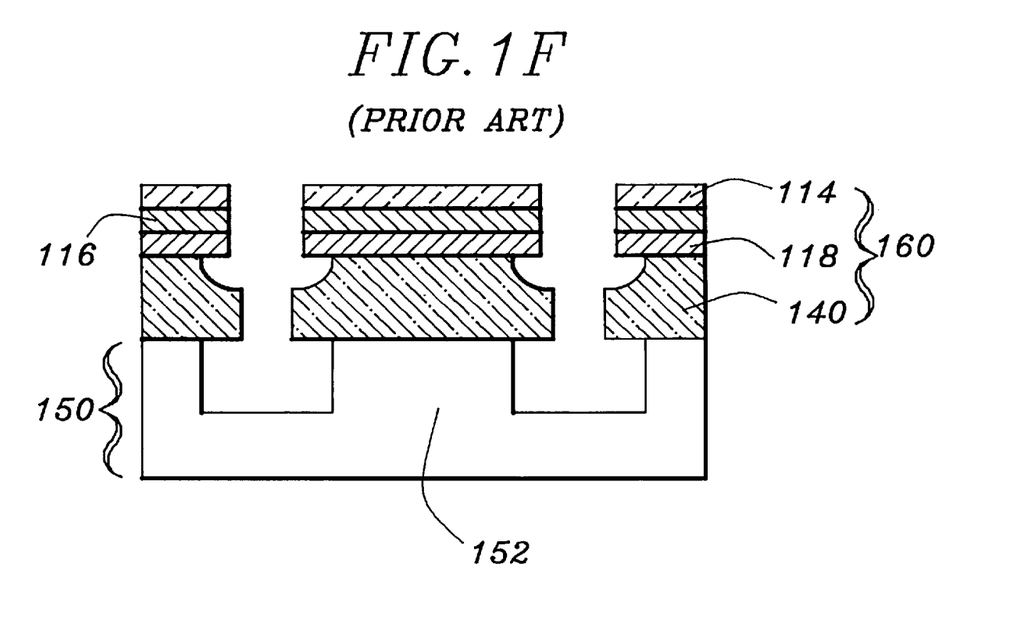

The photoresist layer 130 is then removed with the separation layer 112 concurrently to thereby disengage the substrate 110; and the formation of the M×N mirror array 160 is finalized as shown in FIG. 1F. The fourth metallic layer 140 works as a supporting layer for preventing the first metallic layer 114, which has a substantially larger surface area than that of the actuator, from sagging; and, therefore, the formation of the fourth metallic layer 140 is carried out by such an electroplating technique that can provide a sufficient thickness to suit the intended purpose.

In the above-described fabrication process for an M×N mirror array 160, as illustrated in FIGS. 1A to 1F, it involves the formation of multiple metallic layers, including a cumbersome electroplating process; and therefore, the processing steps tend to be complicated and costly.

SUMMARY OF THE INVENTION

It is, therefore, an object of the present invention to provide an improved method for fabricating and mounting an array of M×N mirrors on an array of M×N actuators, wherein M and N are integers, indicating the number of columns of the actuators in a vertical direction and the number of rows of the actuators in a horizontal direction, respectively, which dispenses with the use of electroplating processes to thereby substantially simplify the fabrication steps.

In accordance with one of the present invention, there is provided a method for fabricating and mounting an array of M×N mirrors on an array of M×N actuators, each of the M×N actuators being made of an electrodisplacive material which deforms in response to an electrical signal applied thereto, each of the M×N mirrors having an identical size and reflecting a ray of light incident thereon in accordance with a deformation of each of the M×N actuators coupled thereto to thereby modulate an optical path of the reflected light, and including a reflector having a flat surface for causing the reflection of said ray of incident light thereon and a supporting member for sustaining the flatness of the reflector incorporated therewith, and further the top surface of each of the M×N mirrors being substantially larger than that of each of the M×N actuators, said method comprising the steps of:

(a) patterning a substrate into an array of M×N identically sized, regularly spaced and disjointed protrusions, each of the protrusions having a flat top surface, by forming regularly spaced and identical (M−1) trenches in the vertical direction and (N−1) trenches in the horizontal direction and each of the trenches having a flat bottom surface;

(b) forming a separation layer on the flat top surface of each of the M×N protrusions and the flat bottom surface of each of the (M−1)×(N−1) trenches;

(c) defining each of the M×N mirrors by forming subsequently a first metallic layer on a top surface of the separation layer, a second metallic layer on a top surface of said first metallic layer, and a third metallic layer on a top surface of said second metallic layer;

(d) bonding the array of M×N actuators onto the array of M×N protrusions such that each of the M×N actuators is aligned with each of the M×N mirrors;

(e) disengaging the substrate from the array of M×N mirrors by removing the separation layer; and (f) forming a fourth metallic layer on a bottom surface of the first metallic layer so as to construct the reflector to thereby provide an array of M×N actuated mirrors.

In accordance with another aspect of the present invention, there is provided another method for fabricating and mounting an array of M×N mirrors on an array of M×N actuators, each of the M×N actuators being made of an electrodisplacive material which deforms in response to an electrical signal applied thereto, each of the M×N mirrors having an identical size and reflecting a ray of light incident thereon in accordance with a deformation of each of the M×N actuators coupled thereto to thereby modulate an optical path of the reflected light, and including a reflector having a flat surface for causing the reflection of said ray of incident light and a supporting member for sustaining the flatness of the reflector incorporated therewith, and further the top surface of each of the M×N mirrors being substantially larger than that of each of the M×N actuators, said method comprising the steps of:

(a) clamping physically a thin glass onto a top surface of a substrate;

(b) bonding the array of M×N actuators onto a top surface of the thin glass;

(c) forming a metallic layer on a bottom surface of the thin glass; and (d) patterning the metallic layer into an array of M×N identically sized, disjointed mirrors to thereby provide an array of M×N actuated mirrors, having the array of M×N mirrors mounted on the array of M×N actuators.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

Referring now to FIGS. 2 and 3, there are provided inventive processes for fabricating and mounting an array of M×N mirrors on an array of M×N actuators, wherein M and N are integers, without having to employ the formation of metallic layers including a cumbersome electroplating process in accordance with the preferred embodiments of the present invention. It should be noted that like parts appearing in FIGS. 2 and 3 have like reference numerals.

Figure 2A:
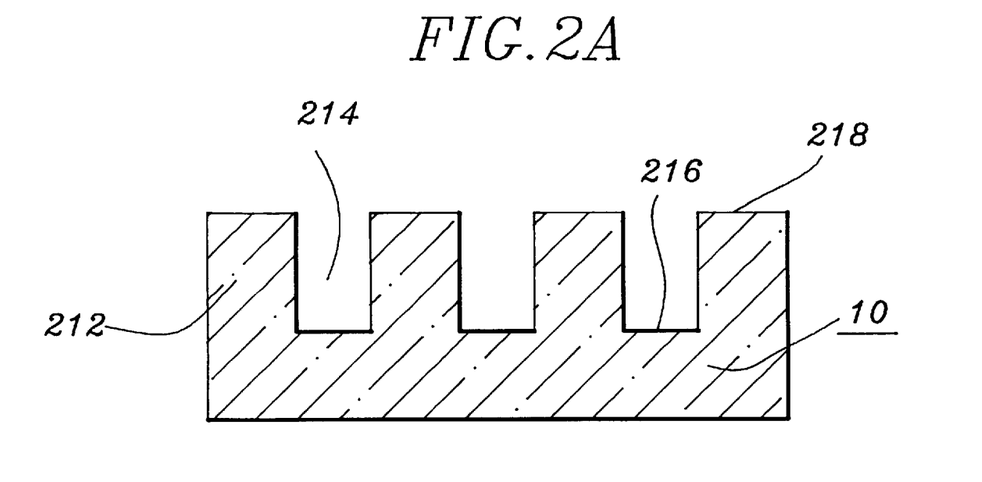
FIGS. 2A to 2D represent schematic cross sectional views showing the fabricating and mounting sequence in accordance with a preferred embodiment of the present invention.

As shown in FIG. 2A, a substrate 10, which is made of, e.g., a glass plate having a good surface flatness, is patterned into an array of M×N identically sized, regularly spaced and disjointed protrusions 212, by forming regularly spaced and identical (M−1) trenches in the vertical direction and (N−1) trenches in the horizontal direction and the array of (M−1)×(N−1) trenches 214, and each of the protrusions 212 having a flat top surface 218, and each of the trenches 214 having a flat bottom surface 216. The definition of the array of (M−1)×(N−1) trenches 214 can be carried out, e.g., by a laser trimming or a wet etching or a dry etching such as a reactive ion etching, each of the trenches 214 having a width ranging from 5 $\mu$m to 15 $\mu$m and a depth ranging from 10 $\mu$m to 20 $\mu$m. Each of the protrusions 212 has a width ranging between 150 $\mu$m and 200 $\mu$m.

Figure 2B:
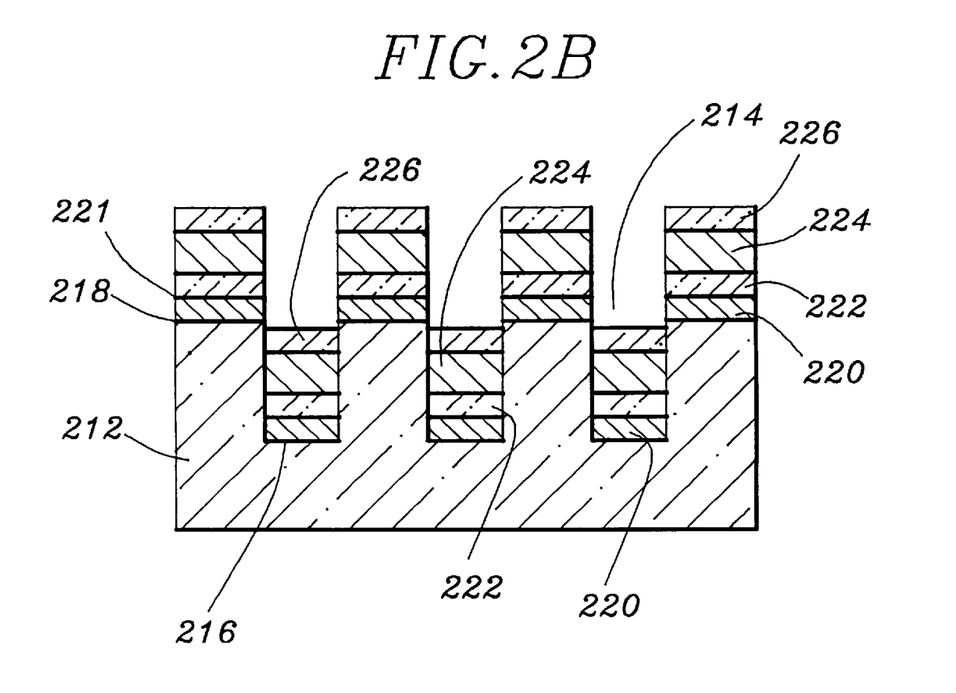

Thereafter, as shown in FIG. 2B, a separation layer 220 is provided on the top surface 218 of an array of M×N protrusions 212 and the bottom surfaces 216 of the trenches 214. The separation layer 220, a thickness of which lies within the range of 2000–4000 Å, is made of a material that can be easily dissolved in water, e.g., an ionic compound such as NaCl or water soluble polymer. Subsequently, a first metallic layer 222, a second metallic layer 224 and a third metallic layer 226 are deposited on the top surface 221 of the separation layer 220. The metallic layers 222, 224 and 226 may be made of either gold or platinum; silver; and either gold or platinum, respectively.

Figure 2C:
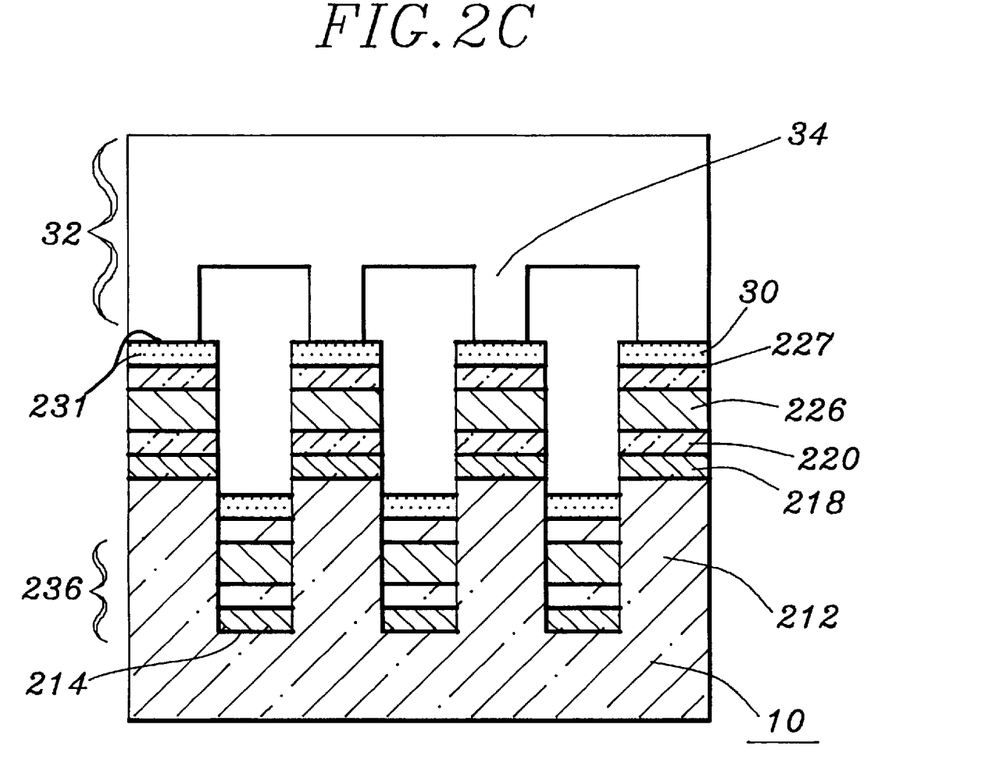

In subsequent steps, as depicted in FIG. 2C, a bonding layer 30 is plated on the top surface 227 of the third metallic layer 226. Thereafter, an array of actuators 32 including M×N actuators 34 is mounted on a top surface 231 of the bonding layer 30 in such manner that each of the M×N actuators 34 aligned with each of the protrusions 212. The metallic layers 222, 224 and 226 and the bonding layer 30 on the protrusions 212 and the array of M×N actuators 32 constitute a actuated mirror array structure. In the next step, the separation layer 220 formed on the top surface 218 of the array of M×N protrusions 212 is removed by using water as a dissolving agent to thereby disengage the array of M×N protrusions 212 from the actuator mirror array structure; as a result, the substrate is removed from the actuated mirror array structure.

Figure 2D:
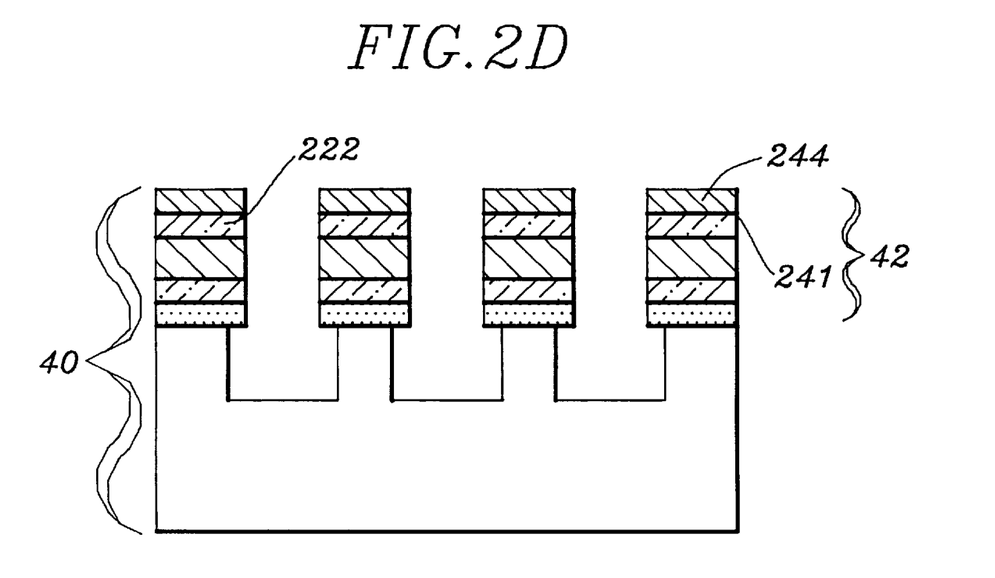

Thereafter, with reference to FIG. 2D, the fourth metallic layer 244 which forms reflectors is deposited on a bottom surface 241 of the first metallic layer 222 to thereby provide an array of M×N actuated mirrors 40, comprising the array of M×N actuators and the array of M×N mirrors 42.

It should be appreciated that the formation of the M×N protrusions dispenses with the need to employ a photolithograph process, to thereby simplify the fabrication steps and prevent damages to the M×N mirrors during the fabrication thereof.

Referring to FIGS. 3A to 3D, there is provided a process for fabricating and mounting an array of M×N mirrors on an array of M×N actuators in accordance with another embodiment of the present invention.

Figure 3A:
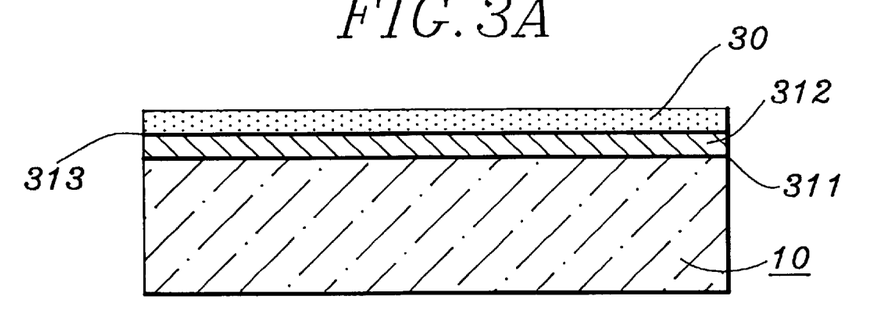
FIGS. 3A to 3E provide schematic cross sectional views describing the fabricating and mounting sequence in accordance with another preferred embodiment of the present invention.

As shown in FIG. 3A, a thin glass 312 is clamped on the top surface 311 of a glass substrate 10 both of them being transparent to an ultraviolet light. Thereafter, a bonding layer 30 is plated on the top surface 313 of the thin glass 312. The bonding layer 30 is made of a material which solidifies when exposed to an ultraviolet light. The preferred thickness of the bonding layer 30 lies within 10 $\mu$m–20 $\mu$m.

Figure 3B:
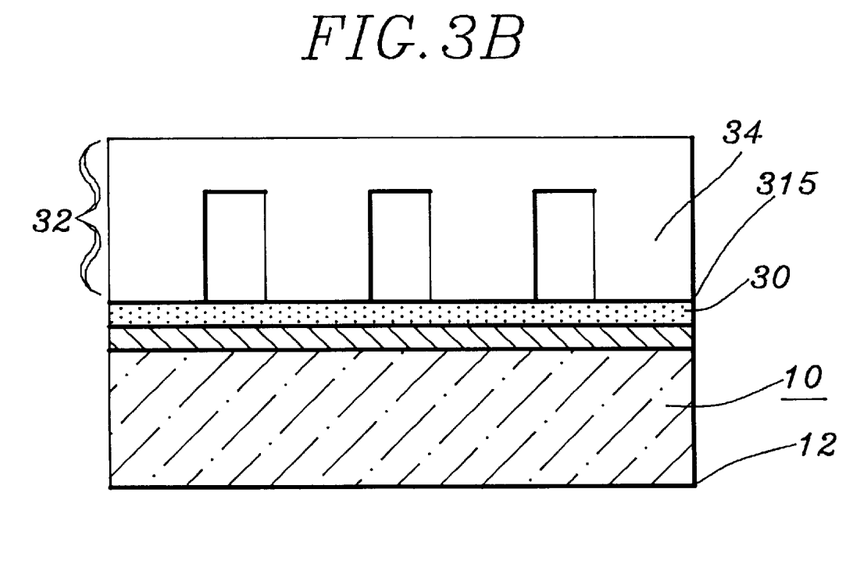

Thereafter, as depicted in FIG. 3B, an array of M×N actuators 32 is mounted on the top surface 315 of the bonding layer 30. And then, an ultraviolet light is illuminated onto a portion of the bonding layer 30 under the array 32 of the actuators 34 through a mask which is placed under the glass substrate 10 in such a manner that a pattern of the mask is aligned with the actuators 34.

Figure 3C:
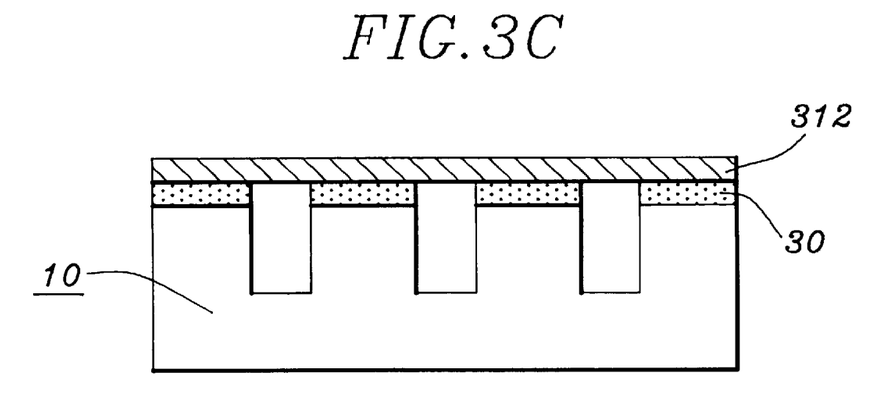

In subsequent steps, with reference to FIG. 3C, the remaining portion of the bonding layer 30 which was not exposed to the ultraviolet light is removed by using an appropriate dissolving agent. Thereafter, the glass substrate is removed from the thin glass 312 by releasing the clamping force.

Figure 3D:
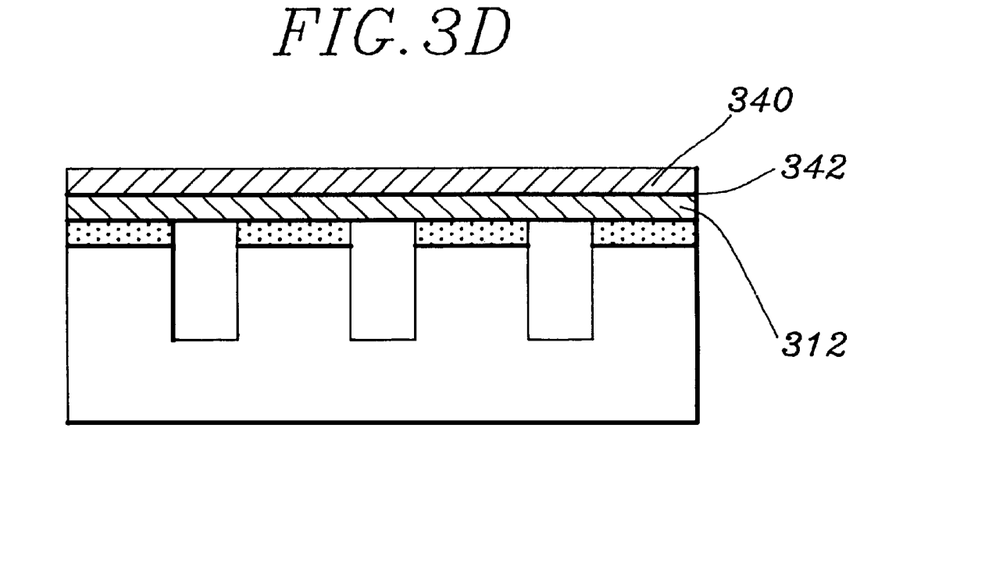

Subsequently, as described in FIG. 3D, a metallic layer 340, made of a light reflecting material, e.g., aluminum(Al), is formed on the thin glass 312, e.g., by using of a sputtering method or thermal evaporation technique.

Figure 3E:
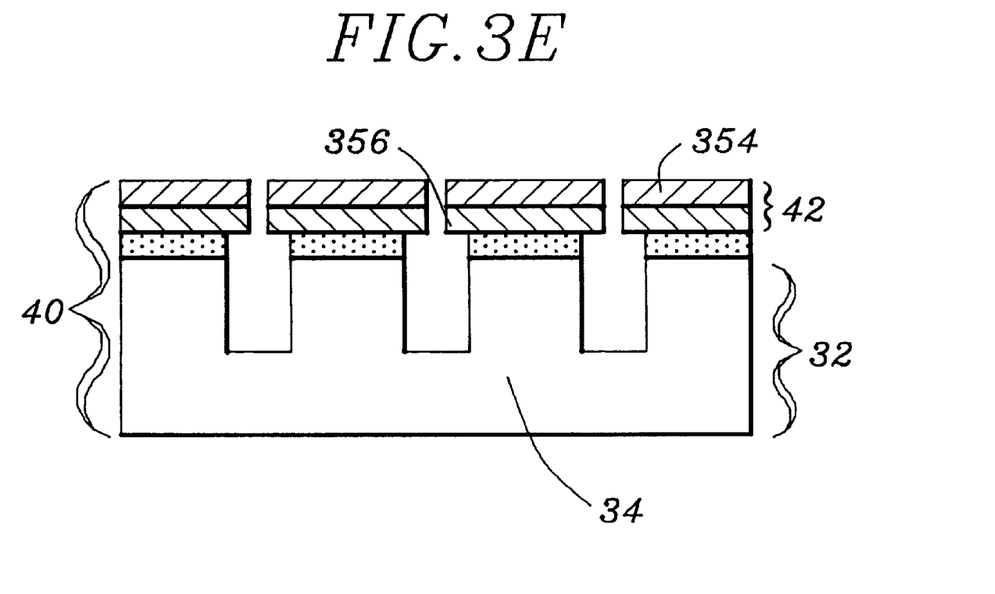

Thereafter, as shown in FIG. 3E, the metallic layer is patterned into an array of M×N reflectors 354 aligned with the array of actuators 32 by using a conventional photolithography process. In the next step, the part of the thin glass which is not covered by the array of M×N reflectors 354 is removed, e.g., by means of a laser trimming or a wet etching or a dry etching such as a reactive ion etching, to thereby provide an array of M×N actuated mirrors 40 comprising the array of M×N mirrors 42, containing the array of M×N reflectors 354, and an array 356 of the thin glasses, each of the mirrors 42 couple to each of the actuators 34 in the actuated mirror array 40.

It should be appreciated that the use of the thin glass in place of the separation layer substantially simplifies the fabrication steps and improves the flatness of the mirror surfaces.

While the present invention has been described with respect to the preferred embodiments only, other modifications and variations may be made without departing from the scope of the present invention as set forth in the following claims.

What is claimed is:

1. A method for fabricating and mounting a mirror array on an actuator array to thereby form an actuated mirror array for use in an optical projection system, wherein the actuator array is composed of M×N equal-sized actuators with M, N being integers, each actuators being made of an electrodisplacive material which deforms in response to an electrical signal applied thereto, the mirror array is composed M×N mirrors of an identical size, each of the mirrors reflecting a ray of light incident thereon in accordance with a deformation of each of the M×N actuators coupled thereto to thereby modulate an optical path of the reflected light, and including a reflector having a flat surface for causing the reflection of said ray of incident light and the top surface of each of the M×N mirrors being substantially larger than that of each of the M×N actuators, said method comprising the steps of:

(a) patterning a substrate into an array of M×N identically sized, regularly spaced and disjointed protrusions, each of the M×N protrusions having a flat top surface, by forming regularly spaced and identical (M−1) trenches in the vertical direction and (N−1) trenches in the horizontal direction and each of the (M−1)×(N−1) trenches having a flat bottom surface;

(b) forming a separation layer on the flat top surface of each of the M×N protrusions and the flat bottom surface of each of the (M−1)×(N−1) trenches;

(c) defining each of the M×N mirrors by forming subsequently a first metallic layer on a top surface of the separation layer, a second metallic layer on a top surface of said first metallic layer, and a third metallic layer on a top surface of said second metallic layer;

(d) bonding the array of M×N actuators onto the array of M×N protrusions such that each of the M×N actuators is aligned with each of the M×N mirrors;

(e) disengaging the substrate from the array of M×N mirrors by removing the separation layer; and (f) forming a fourth metallic layer on a bottom surface of the first metallic layer so as to construct the reflector to thereby provide an array of M×N actuated mirrors.

2. The method of claim 1, wherein the trenches of the substrate are provided by means of a laser trimming or a wet etching or a dry etching such as a reactive ion etching.

3. The method of claim 1, wherein the metallic material is aluminum.

4. The method of claim 1, wherein the M×N protrusions is used in place of photolithography process.

* * * * *